United States Patent [19]

Senez

[11] Patent Number: 4,871,813
[45] Date of Patent: Oct. 3, 1989

[54] POLYMER COMPOSITIONS BASED ON LINEAR LOW DENSITY POLYETHYLENE AND PROPYLENE COPOLYMERS

[75] Inventor: Alain Senez, Cabries, France

[73] Assignee: BP Chemicals Limited, London, England

[21] Appl. No.: 91,758

[22] Filed: Aug. 31, 1987

[30] Foreign Application Priority Data

Sep. 2, 1986 [FR] France ................ 86 12329

[51] Int. Cl.$^4$ .................... C08L 23/18; C08L 23/08
[52] U.S. Cl. ................................... 525/240
[58] Field of Search ........................ 525/240

[56] References Cited

U.S. PATENT DOCUMENTS 4,430,457 2/1984 Dobroski ................ 523/100
4,563,504 1/1986 Hert ...................... 525/240

FOREIGN PATENT DOCUMENTS 0128046 12/1984 European Pat. Off. .
0191990 8/1986 European Pat. Off. .
58-217534 6/1982 Japan .
59-041342 3/1984 Japan .
59-9202244 11/1984 Japan .
60-161442 8/1985 Japan .
2133018A 7/1984 United Kingdom .
2152516 8/1985 United Kingdom .

Primary Examiner—Carman J. Seccuro
Attorney, Agent, or Firm—Brooks Haidt Haffner & Delahunty

[57] ABSTRACT

A polymer composition comprising (a) 99 to 75 weight percent of LLDPE and (b) 1 to 25 weight percent of a copolymer of propylene (CP) with 7 to 40 weight % o one or more $C_4$ to $C_{12}$ alpha-olefins and 0 to 10 weight % of ethylene. The propylene copolymer (CP) has a fusion enthalpy not more than 75 J/g. The composition is readily converted into uniform thickness film by extrusion blowing, and exhibits good hot tack strength during heat-sealing operations.

12 Claims, 1 Drawing Sheet

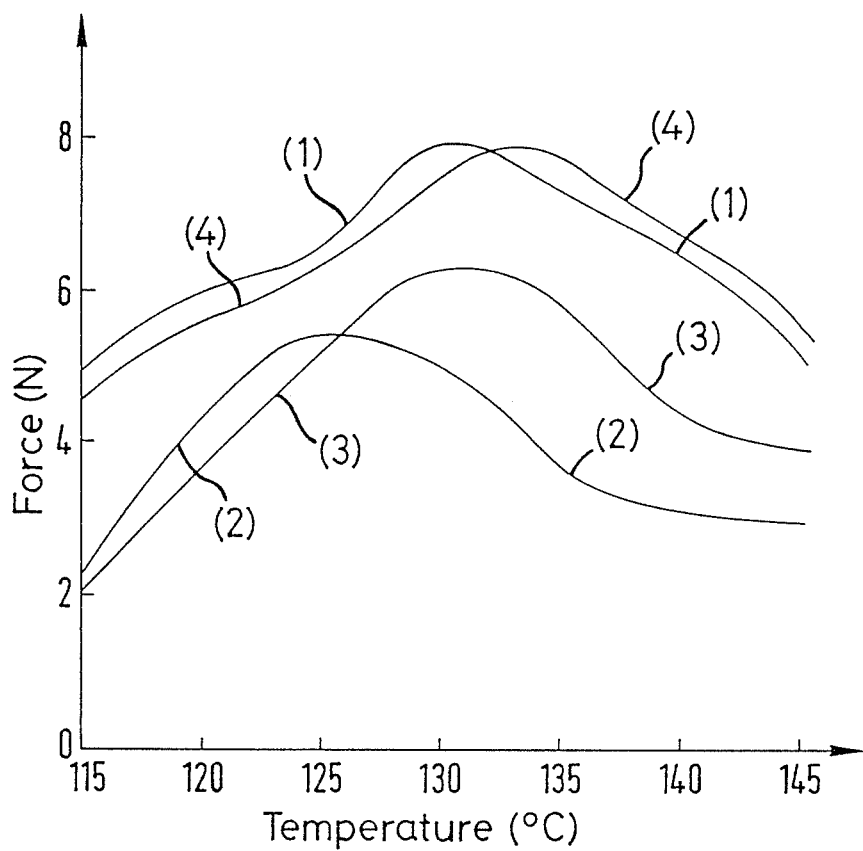

POLYMER COMPOSITIONS BASED ON LINEAR LOW DENSITY POLYETHYLENE AND PROPYLENE COPOLYMERS

The present invention relates to compositions based on linear low density polyethylene, particularly for the production of film by the extrusion-blowing process.

It is known to use linear low density polyethylene (LLDPE) for the production of films, such films having advantages especially as regards optical and mechanical properties in comparison with conventional low density polyethylene films (LDPE) obtained by the free radical polymerisation of ethylene at elevated pressure and temperature. However, it has been noted that the production of LLDPE films by extrusion-blowing, more particularly using an annular die, raises a certain number or problems, due to the very nature of the LLDPE, since LLDPE has a low mechanical strength in the molten condition and a relatively high viscosity for the shearing rates normally applied during extrusion-blowing. More particularly, in comparison with LDPE, the production of LLDPE requires certain modifications of the control of the extruders, more particularly with a view to maintaining their output unchanged. Thus, for example, the gap of the die is preferably enlarged and its outlet temperature raised. As a result, the bubble formed at the outlet from the annular die becomes more difficult to cool, the thickness of the film produced is more irregular and the risks that the bubble will burst are greater. It has also been found that heat seals or welds of LLDPE films have relatively poor heat resistance. It has already been suggested that such resistance can be improved by using a composition of LLDPE and LDPE, but unfortunately the resulting films also have poor impact and tearing strength.

New compositions based on LLDPE have now been found which improve the production of films by extrusion blowing, more particularly using an annular die, and enhance the yield of the extruders without however effecting the quality of the films produced. The heat resistance of heat-sealed welds in films obtained from these new compositions is also substantially higher than that of LLDPE films, while retaining satisfactory optical and mechanical properties.

The present invention provides a polymer composition comprising:
(a) from 99 to 75 weight percent of linear low density polyethylene having a density in the range of 0.891 to 0.940, and
(b) from 1 to 25 weight percent of a copolymer (CP) of propylene with 7 to 40 weight percent (based on total weight of copolymer (CP) of one or more $C_4$ to $C_{12}$ alpha olefins and 0 to 10 weight percent of ethylene, the weight content of the ethylene, if any, in copolymer CP being less than the weight of the $C_4$ to $C_{12}$ alpha olefin therein, said copolymer having a fusion enthalpy of not more than 75 J/g.

The LLDPE used in the new compositions according to the invention has a density of between 0.890 and 0.940, preferably between 0.90 and 0.935 and more particularly between 0.910 and 0.930. The LLDPE comprises a copolymer of ethylene and at least one alpha olefin containing 3-12 carbon atoms, preferably selected from propylene, 1-butene, 1-pentene, 1-hexene, 4-methyl-1-pentene or 1-octene. The content by weight of the or each $C_3$ to $C_{12}$ alpha olefin in the LLDPE is generally between 3 and 20%, preferably between 4 and 15%, and more particularly still between 5 and 12%. Thus, for example, the LLDPE used in the compositions according to the invention can be a copolymer of ethylene and 1-butene, a copolymer of ethylene and 1-hexene, a copolymer of ethylene and 4-methyl-1-pentene or a copolymer of ethylene and 1-octene. Use can also be made of a terpolymer of ethylene, propylene and 1-butene, a terpolymer of ethylene, 1-butene and 4-methyl-1-pentene or a terpolymer of ethylene, 1-butene and 1-hexene.

Preferably the LLDPE has a melt index (MI 2.16/190), measured under a load of 2.16 kg at 190° C., of between 0.1 and 10 g/10 minutes, preferably between 0.3 and 5 g/10 minutes. It also advantageously has a relatively narrow molecular weight distribution such that the ratio between the weight average molecular weight Mw and the number average molecular weight Mn determined by gel permeation chromotography is between 2.5 and 6, preferably between 3 and 5.5. The structure of the LLDPE is also characterised by a very low degree of long chain branching (g*), which is expressed by a value equal to or greater than 0.90, (n) being the measured intrinsic viscosity of the LLDPE and ($n_1$) being the intrinsic viscosity of a high density linear ethylene homopolymer having the same average molecular weight, Mw, as that of the LLDPE.

By differential scanning calorimetric analysis, the LLDPE generally has one or more melting points at a temperature between 110° C. and 128° C.; the preferred LLDPE has a single melting point at a temperature between 115° C. and 128+ C. The melting enthalpy of the LLDPE corresponds to a degree of crystallinity of between about 25% and 50%, such crystallinity being expressed with reference to a high density linear ethylene homopolymer.

The LLDPE used in the composition according to the invention is obtained by copolymerisation of ethylene with at least one alpha olefin containing 3-12 carbon atoms in the presence of a Ziegler-Natta type catalytic system comprising on the one hand a co-catalyst formed by at least one organo-metallic compound of a metal of Group II or III of the Periodic Table of elements, and on the other hand a catalyst comprising a transition metal compound of sub-groups IVa, Va or VIa of the Table, the transition metal compound being optionally associated with a magnesium compound and/or a solid support. Copolymerisation is preferably performed at low pressure, more particularly a pressure between 0.5 and 5 MPa, by a process either in suspension or in solution in a liquid hydrocarbon diluent, or preferably in the gaseous phase by means of a fluidised and/or mechanically stirred bed for example those disclosed in French Pat. No. 2405061 and 2563833.

It has been found that the LLDPE obtained by the copolymerisation process in the gaseous phase has a special crystalline structure and therefore confers outstanding and advantageous properties on the compositions according to the invention. Differential scanning calorimetry (DSC) indicates that this LLDPE has on the one hand a substantial amorphous phase whose fairly extensive melting plateau is lower than 115° C., and on the other hand a crystalline phase characterised by a single melting point preferably lying between 115° C. and 128° C., and therefore corresponding to crystallites of a particular dimension.

The compositions according to the invention comprise in addition to the LLDPE a copolymer (CP) of propylene and at least one alpha olefin containing 4-12 carbon atoms and optionally ethylene. The alpha olefin can be selected more particularly from 1-butene, 1-pentene, 1-hexene, 4-methyl-1-pentene or 1-octene. Preferably the propylene copolymer (CP) is a copolymer of propylene and 1-butene, a copolymer of propylene and 1-hexene, a copolymer of propylene and 4-methyl-1-pentene, a terpolymer of propylene, 1-butene and ethylene, or a terpolymer of propylene, 4-methyl-1-pentene and ethylene. The content of such alpha olefin by weight in the propylene copolymer is between 7 and 40%, preferably between 10 and 35%. The propylene copolymer (CP) is most preferably a copolymer of propylene and 1-butene containing from 10 to 35 weight percent of 1-butene. The content of ethylene by weight in the propylene copolymer is in the range 0 (zero) to 10%, for example between 2 and 7%, provided that the quantity of ethylene, if any, is less than the quantity of $C_4$ to $C_{12}$ alpha olefin in the propylene copolymer CP.

The propylene copolymer use in the compositions according to the invention must have a fusion enthalpy equal to or lower than 75 J/g, preferably between 20 and 60 J/g, such fusion enthalpy being measured by DSC. The fusion enthalpy of the copolymer is a characteristic connected with the molecular structure of the copolymer, since it is higher in proportion as the copolymer structure is more ordered. Thus, the fusion enthalpy of a purely isotactic polypropylene, whose molecular structure is perfectly regular, would be 210 J/g. It is therefore possible, by reference to the fusion enthalpy of this purely isotactic polypropylene, to assess the regularity of the molecular structure of the propylene copolymer used in the compositions according to the invention, and therefore its degree of crystallinity, which is lower than 35%, preferably between about 10 and 30%.

The propylene copolymer advantageously has a melt index (MI 2.16/230), measured under a load of 2.16 kg at 230° C., of between 0.1 and 10 g/10 minutes, preferably between 0.3 and 5 g/10 minutes.

The propylene copolymer is obtained by copolymerisation of a mixture of propylene and at least one alpha olefin comprising 4-12 carbon atoms optionally with ethylene, in the presence of a Ziegler-Natta type catalytic system which is preferably adapted to polymerise the propylene stereospecifically. It is more particularly preferred to use a catalytic system formed on the one hand by a solid compound based on titanium trichloride and on the other an organo-aluminium compound. Copolymerisation is also preferably performed while maintaining the amounts of propylene and alpha olefin containing 4-12 carbon atoms, and optionally ethylene, substantially constant, at a total pressure of between 0.5 and 5 MPa, by a process either in suspension or in solution in a liquid hydrocarbon diluent, or preferably in gaseous phase by means of a fluidised and/or mechanically stirred bed, for example as disclosed in French Pat. No. 2462449. The copolymerisation process in the gaseous phase has the advantage of providing the propylene copolymer directly in the form of a powder made up of uniform particles of about 0.5 to 1 mm in diameter, without its having to be separated from a liquid diluent.

It has been observed that the propylene copolymers obtained from a gaseous mixture, in which the propylene, at least one alpha olefin containing 4-12 carbon atoms and optionally ethylene, are maintained in constant ratios, have a structure such that the proportion, denoted by the symbol "PIB" of isolated alkyl branches containing 2-10 carbon atoms in relation to the total alkyl branches containing 2-10 carbon atoms in the copolymer is at least equal to the square of the proportion [P] of units derived from the propylene contained in the copolymers. According to the theories of the kinetics of copolymerisation, the expression "PIB"=$[P]^2$ corresponds to a purely random dispersion in the macro molecular chain of the units derived from alpha olefin having 4-12 carbon atoms; it is in accordance with the fact observed experimentally by G. NATTA et al (Journal of Polymer Science Vol. 51, page 429-1961), according to which the reaction rates of the propylene and the higher alpha olefin are substantially independent of the final structure of the polymeric chain in course of growth. The "PIB" proportion is conveniently measured by analysing a copolymer specimen by nuclear magnetic resonance of carbon 13 (NMR C13). It therefore expresses the proportion in the macro molecular chains of units derived from alpha olefin containing 4-12 carbon atoms, isolated between two units of propylene, in relation to the whole of the units derived from alpha olefin containing 4-12 carbon atoms. Moreover the proportion, [P] of units derived from propylene is also measured by analysing a copolymer sample by NMR C13.

The compositions according to the invention can be obtained by mixing its constituents in the molten condition. One effective method consists of first mixing the constituents in the solid state, as pellet or powder, whereafter the mixture in the molten condition is produced in conventional machines, such as single or twin screw extruders, such operations being followed by pelleting. The mixture in the molten condition can also be produced directly in the machines for conversion into finished articles, such as extruders, from pellets or preferably powders of the constituents, premixed in the solid state, this having the advantage of eliminating the pelleting operation. This is more particularly possible when the LLDPE and the propylene copolymer have been directly produced in powder form by the processes of copolymerisation in the gaseous phase, using a fluidised and/or mechanically agitated bed.

The compositions according to the invention can also comprise various known additives customarily used in extrusion, such as slip agents, stabilising agents, antioxidants, anti-UV agents and antiblocking agents.

The compositions according to the invention are particularly suitable for making films by the current extrusion blow-moulding techniques, more particularly using an annular die. The use of these compositions enables the conditions of producing these films to be improved and the performance of the extruders to be enhanced, without effecting the quality of the films, more particularly as regards their optical and mechanical properties, which are comparable to those of films produced solely from LLDPE. More particularly, the compositions enable very wide films of a highly regular thickness to be produced. Moreover, the heat resistance of welds made on films thus prepared is appreciably enhanced, without the other properties being substantially weakened. Thus, the FIG. shows clearly that films obtained from compositions according to the invention (curves 1 and 4) have the highest heat resistances of the welds.

These films are particularly suitable for making packaging and bags and also for agricultural applications, in which frequently use is made of very wide films, which are more readily produced with the compositions according to the invention than with the prior art LLDPE or LLDPE compositions.

BRIEF DESCRIPTION OF THE DRAWING

The FIGURE plots the force required to detach at a given temperature (°C.) a weld made at the same temperature, with Runs (1) and (4) being representative of the invention and Runs (2) (3) being comparative.

DIFFERENTIAL SCANNING CALORIMETRY (DSC)

DSC analysis consists in recording the enthalpy graph of a 5 mg sample of a copolymer by heating at a speed of 16° C. per minute up to 200° C., the sample having been previously subjected to a thermal treatment formed by heating at a speed of 16° C. per minute up to 200° C., followed by maintenance of such temperature for 20 minutes and cooling at a speed of 16° C. per minute down to 50° C.; the surface of the endothermic peak recorded during the heating is proportional to the melting enthalpy: the DSC analysis therefore enables the melting enthalpy of the copolymer to be measured, corresponding to the quantity required to melt 1 gramme of such copolymer.

MEASURING THE MOLECULAR WEIGHT DISTRIBUTION

The molecular weight distribution of a copolymer is calculated in accordance with the ratio between the weight average molecular weight Mw and the number average molecular weight Mn of the copolymer, from a distribution curve of molecular weights obtained by means of a gel permeation chromotograph ("DU PONT" Type "860" High Temperature Size Exclusion Chromatograph), having a "DU PONT", Type "870" pump, the operating conditions being as follows:
solvent : 1,2,4-trichlorobenzene
flow rate of solvent : 0.8 ml/minute
columns: three "DU PONT" columns with a "ZORBAX" lining, of granulometry 6 microns and porosity 60 A, 1000 A and 4000 A respectively (A=Angstrom units)
temperature: 150° C.
concentration of sample : 1.15% by weight
injection volume : 300 ml
infrared detection: at wave length 3.425 microns, using a cell 1 mm in thickness
calibration using a high density polyethylene sold by BP Chemicals under the commercial name "RIGIDEX HD 6070 EA"®: Mw=70 000 and Mw/Mn=3.8

METHOD OF DETERMINING THE DEGREE OF LONG CHAIN BRANCHING, G*

In the formula $g^* = (n)/(n)_1$, the intrinsic viscosity (n) of the copolymer is measured in trichlorobenzene at 135° C. Viscosity $(n)_1$ of the linear polymer, having the same weight average molecular weight, Mw, as such copolymer, is calculated by the following equation of the MARK-HOUWINK type : $(n)_1 = 6.02 \times 10^{-4} \times (Mw)^{0.69}$; the weight average molecular weight, Mw, of the copolymer is determined by gel permeation chromatography, the fractionation columns being calibrated by means of linear polyethylene samples.

MEASUREMENT OF MELT INDICES (MI 2.16/190 AND MI 2.16/230)

The melt index (MI 2.16/190) is measured under a load of 2.16 kg at 190° C. by the ASTM-D-1238 method - Condition E.

The melt index (MI 2.16/230) is measured under a load of 2.16 kg at 230° C. to the ASTM-D-1238 method - Condition L.

MEASUREMENT OF DENSITY

This measurement is performed to standard ASTM-D-1505.

MEASUREMENT OF TENSILE STRENGTH AT YIELD

This measurement is performed to standard ASTM-D-638.

MEASUREMENT ON FILM :

Perforation strength ("Dart Test") measured according to standard ASTM-D-1709 ;
Tear strength ("ELMENDORF") in the machine direction measured by standard ASTM-D-1922
Heat resistance of the weld : the conditions of this measurement allow the reproduction of the stresses exerted on the welds produced in modern fast, automatic bag making processes using these films ; measurement consists in determining the force in Newtons applied to detach at a given temperature (°C.) a weld made at the same temperature on a film 70 microns in thickness, 508 mm in length and 63.5 mm in width, using a commercially available "TACKFORSK 52/B" ® welding machine marketed by DTC (Sweden). The film is attached by one of its ends at a fixed point situated above the upper jaw of the welding machine; then the film, passing between two rolls and inside a polyamide sheet disposed between the two jaws of the welding machine, is folded in two at its centre; a load of a given weight is attached to the other end of the film, which remains free and situated outside the jaws. Before the welding jaws close on the film no load is applied to the end of the film. Welding is performed at a given temperature by closing the jaws for a period of 0.15 second at a pressure of 1.5 N.mm². Welding is ended by moving the jaws apart, and 0.1 second after the end of welding the load of a given weight is applied to the free end of the film; in this way that force is determined which is required to detach the weld produced at the given temperature.

The invention is illustrated by the following non-limitative examples.

EXAMPLE 1

Use was made in this Example of:
a LLDPE which is a copolymer of ethylene and 1-butene, obtained by a copolymerisation process in gaseous phase using a fluidised bed, commercially available from BP Chemicals under the name "LL0209 AA" ®; it had a content by weight of 7.5% of units derived from 1-butene, a density of 9.920, a melt index (MI 2.16/190) of 0.9 g/10 minutes, a molecular weight distribution (MWD) of 4, a degree of long chain branching g* of 0.97 and a single melting point of 122° C., determined by differential calorimetry;

A copolymer of propylene and 1-butene referred to as "PP 3406", having a content by weight of 26% of units derived from 1-butene, a melt index MI 2.16/230 of 1.9 g/10 minutes, a fusion enthalpy of 38 Jg, a crystallinity degree of 18%, a structure such that the "PIB"/$P^2$ ratio is equal to 1.25 and a tensile strength at yield of 14 MPa; the preparation of this copolymer is indicated at the end of this Example.

By mixing on a twin "WERNER 28" pelleting machine operating at a temperature of 200° C. and at a screw rotation speed of 200 rpm, a composition (A) was produced according to the invention comprising:

(a) 90% by weight of the LLDPE "INNOVEX LL0209 AA" ® and (b) 10% by weight of the propylene copolymer "PP 3406"

This composition was transformed into a film 38 microns in thickness on a "KIEFEL RO-40" extruder, with a blow up ratio of 2/1. The mechanical properties of the film, whose values are shown in Table 1, are excellent. The hot weld resistance of the film, illustrated by curve (1) FIG. 1, shows that it is at a relatively high level.

Preparation of the copolymer of propylene and 1-butene "PP 3406"

(a) Preparation of the Catalyst 120 moles of titanium tetrachloride, 7.2 liters of n-hexane and 26.4 moles of diisoamyl ether were introduced at 25° C. into a stainless steel 60 liter reactor having a stirring system and a heating and cooling device. The mixture was then heated to 35° C. and a solution obtained at 25° C. by mixing 10.2 moles of diisoamyl ether and 15 moles of diethylaluminium chloride (DEAC) dissolved in 10.8 liters of n-hexane was then introduced slowly into the reactor over 4 hours. A solid precipitate was obtained which was kept stirred for 1 hour at 35° C. and then for 2 hours at 65° C. The solid precipitate was then washed 5 times by decantation with 30 liters of n-hexane at 65° C. It contained 28.8 gram atoms of titanium.

Into a 60 liter stainless steel reactor provided with a stirrer and a device for heating and cooling, are introduced 24 liters of a suspension in hexane of the solid precipitate prepared previously, containing 6 gramme atoms of titanium. Then 6 moles of diethylaluminium chloride (DEAC) are introduced into the reactor which is maintained at a temperature of 25° C. Gaseous propylene is then passed in at a rate of 720 grammes per hour for a period of 5 hours. At the end of this time, the introduction of the propylene is stopped, and the suspension of catalyst thus obtained is kept stirred at the same temperature for 1 hour. After this, the stirrer is stopped, the catalyst is allowed to settle and three washings of the latter are carried out by drawing-off the supernatant liquid and refilling with 24 liters of n-hexane.

There is thus obtained the catalyst, ready for use, which contains per milligram atom of titanium, 0.01 millimole of aluminum trichloride, less than 0.001 millimoles of diisoamyl ether and 0.6 grammes of propylene. It is in the form of substantially spherical particles having a mean diameter by mass of 25 microns.

(b) Preparation of the prepolymer

Into a 1000 liter stainless steel reactor provided with a stirrer rotating at 140 revolutions per minute and with a device for heating and cooling, there is introduced under nitrogen 500 liters of n-hexane which is heated to 50° C., then 7.5 liters of a molar solution of DEAC in n-hexane and a quantity of the catalyst, prepared previously, containing 1.5 gramme atoms of titanium. A quantity of hydrogen corresponding to a partial pressure of 0.02 MPa is then introduced into the reactor, followed by propylene which is added at a rate of 12.5 kg per hour for 6 hours. The reactor is then degassed and cooled to ambient temperature (20° C.). The supernatant liquid is withdrawn from the suspension of prepolymer thus obtained, 7.5 moles of DEAC are added and then it is dried under nitrogen. The prepolymer thus obtained is in the form of a powder consisting of particles having a mean diameter by mass of 110 microns and containing 0.02 milligram atoms of titanium per gramme.

(c) Copolymerisation of propylene with n-butene in a fluidised bed 100 kg of a propylene and 1-butene copolymer powder (identical with that to be produced) and originating from a preceding reaction was introduced into a stainless steel fluidised bed type reactor 45 cm in diameter having a fluidisation grid at its base. The powder was subjected to nitrogen sweeping at 60° C. until a water content of the reactor atmosphere was obtained at 3 vpm. Then a gaseous mixture formed by hydrogen, propylene, 1-butene and nitrogen at an ascending velocity of 35 cm/second was introduced into the reactor at a temperature of 60° C. The partial pressures (pp) of the constituents of the gaseous mixture were as follows:

pp hydrogen = 0.01 MPa
pp propylene = 0.41 MPa
pp 1-butene = 0.18 MPa
pp nitrogen = 1.30 MPa 0.7 liter of a molar solution of DEAC in n-hexane was then introduced into the reactor, which was then held under these conditions for 1 hour. Then 60 g of the previously prepared prepolymer was introduced into the reactor in a sequenced manner, at the rate of 1 injection every 2 minutes. After several hours of stabilisation of the copolymerisation conditions, about 18 kg/h of the propylene and 1-butene copolymer powder "PP 3406" was recovered by sequenced withdrawal.

EXAMPLE 2 (COMPARATIVE)

Operations were performed exactly as in Example 1, except that "INNOVEX LL0209 AA" ® LLDPE alone was used by way of comparison, instead of using composition (A).

Table 1 shows the mechanical properties of the film obtained solely from this LLDPE: they are substantially identical with those of the film obtained from composition (A). However, the hot welding resistance of the film obtained from the LLDPE alone, illustrated by curve (2) in FIG. 1, is considerably lower than that of the film obtained from composition (A) according to the invention.

EXAMPLE 3 (COMPARATIVE)

Operations were performed exactly as in Example 1, except that instead of producing composition (A), a composition (B) was produced by way of comparison, comprising:

(a) 90% by weight of the LLDPE "INNOVEX LL0209 AA" ®

(b) 10% by weight of a low density polyethylene (LDPE) obtained by free radical polymerisation of ethylene at high temperature and high pressure and sold under the name "BP 46" ® by BP Chemicals, such LDPE having a density of 0.921, a melt index (MI 2.16/190) of 2.0 g/10 minutes, a degree of long branching g* of 0.5 and a melting point of 105° C., determined by differential calorimetry.

Table 1 shows the mechanical properties of the film obtained from this composition: they are appreciably lower than those of the film obtained from composition (A) according to the invention. The hot welding resistance of the film obtained from composition (B), illustrated by curve (3) in FIG. 1, is also greater than that of the film based on LLDPE alone (Comparative Example 2), but remains lower than that of the film obtained from composition (A) according to the invention.

EXAMPLE 4

Operations were performed exactly as in Example 1, except that instead of producing composition (A), a composition (C) was produced comprising:
(a) 85% by weight of the LLDPE "INNOVEX LL0209 AA" ® and
(b) 15% by weight of the propylene copolymer "PP 3406"

Table 1 shows the mechanical properties of the film obtained from this composition. The hot welding resistance of the film is also illustrated by curve (4) in FIG. 1.

EXAMPLE 5

By mixing on a twin-screw "WERNER 28" pelleting machine operating at a temperature of 200° C. and a screw rotational speed of 200 rpm, a composition (D) was produced comprising:
(a) 89% by weight of LLDPE "INNOVEX LL0209 AA" ®,
(b) 10% by weight of a propylene and 1-butene copolymer "PP 3404", having a content by weight of 20% of units derived from the 1-butene, a melt index (MI 2.16/230) of 0.5 g/10 minutes, a fusion enthalpy of 42 J/g, a degree of crystallinity of 20%, a structure such that the ratio "PIB"/[P]$^2$ is equal to 1.05 and a tensile strength at yield of 15 MPa; the preparation of this copolymer is indicated at the end of this Example; and
(c) 1% by weight of a master batch comprising silica and an amide as slip agent known by the trade name "PZ 904" and sold by BP Chemicals.

The composition was converted into a film 50 microns in thickness on a "KIEFEL RO-40" extruder at a blow-up ratio of 2/1, using an annular die 200 mm in diameter and with a gap of 1.8 mm. The bubble formed at the outlet from the die was obtained with a material flow rate of 35 kg/h and a film winding speed of 40 metres per minute in outstanding conditions, so that the thickness of the resulting film varied very little (50±4 microns).

The use of composition (D) according to the invention also enabled film production to be increased, while maintaining film quality, with a material flow rate of 43 kg/h and a film winding speed of 50 m/mn.

Preparation of the propylene and 1-butene copolymer "PP 3404"

Copolymerisation of propylene with 1-butene in fluidised bed

Operations were performed as in Example 1 to prepare the propylene and 1-butene copolymer "PP 3406", except that the partial pressures (PP) of the gaseous mixture were altered as follows:
pp hydrogen=0.005 MPa
pp propylene=0.455 MPa
pp 1-butene=0.140 MPa
pp nitrogen=1.300 MPa After several hours of stabilisation of the copolymerisation conditions, about 19 kg/h of the propylene and 1-butene copolymer powder "PP 3404" were recovered by sequenced withdrawal.

EXAMPLE 6 (COMPARATIVE)

Operations were performed exactly as in Example 5, except that instead of producing the composition (D), a composition (E) was produced by way of comparison, comprising:
(a) 99% by weight of the LLDPE "INNOVEX LL0209 AA" ® and
(b) 1% by weight of the master batch "PZ 904".

Composition (E) was converted into a film, as in Example 5. However, it was found that the bubble formed at the outlet from the dies was not very stable and the thickness of the resulting film varied appreciably (50±8 microns).

Moreover, it was impossible to increase film production, more particularly beyond a material flow rate of 35 kg/h and a film winding speed of 40 m/mn without more seriously affecting the quality of the film.

TABLE 1

| | Mechanical Properties of the Films 39 Microns in Thickness, obtained from Compositions A, B, C and the LLDPE alone | | | |
|---|---|---|---|---|
| Polymer or Composition | Composition A (Example 1) | LLDPE (Comparative Example 2) | Composition B (Comparative Example 3) | Composition C (Example 4) |
| Perforation Strength ("Dart test") (g) | 140 | 130 | 120 | 130 |
| Tearing Strength ("Elmendorf") in machine direction (g/25 microns) | 145 | 148 | 60 | 144 |

I claim:
1. A polymer composition comprising:
(a) from 99 to 75 weight percent of linear low density polyethylene consisting of a copolymer of ethylene with at least one alpha-olefin containing 3–12 carbon atoms, and
(b) from 1 to 25 weight percent of a copolymer (CP) of propylene with 7 to 40 weight percent (based on total weight of copolymer CP) of one or more $C_4$ to $C_{12}$ alpha olefins and 0 to 10 weight percent of ethylene, the weight content of the ethylene, if any, in copolymer CP being less than the weight of the $C_4$ to $_{12}$ alpha olefin therein, said copolymer having a fusion enthalpy of not more than 75 J/g.

2. A composition according to claim 1 wherein the content of the linear low density polyethylene is in the range 95 to 80 weight percent, and the content of the propylene copolymer CP is in the range 5 to 20 weight percent.

3. A composition according to claim 1 characterised in that the linear low density polyethylene is obtained by copolymerisation of ethylene and at least 1 alpha olefin containing 3 to 12 carbon atoms in the presence of a Ziegler-Natta type catalytic system.

4. A composition according to claim 3 characterised in that the alpha olefin in the linear low density polyethylene is selected from propylene, 1-butene, 1-pentene, hexene-1, 4-methyl-1-pentene or 1-octene.

5. A composition according to claim 1 wherein the propylene copolymer (CP) is a copolymer of propylene and butene, a copolymer of propylene and hexene, a copolymer of propylene and 4-methyl-1-pentene, a terpolymer of propylene, 1-butene and ethylene, or a terpolymer of propylene, 4-methyl-1-pentene and ethylene.

6. A composition according to claim 1 wherein the propylene copolymer is a copolymer of propylene and 1-butene containing from 10 to 35 weight percent of 1-butene.

7. A composition according to claim 1 characterised in that the propylene copolymer (CP) is obtained by copolymerisation of a mixture of propylene and at least one alpha olefin containing 4–12 carbon atoms optionally with ethylene in the presence of a Ziegler-Natta type catalytic system adapted to polymerise propylene stereospecifically.

8. A composition according to claim 7 characterised in that the alpha olefin used to make the propylene copolymer CP is selected from 1-butene, 1-pentene, 1-hexene, 4-methyl-1-pentene or 1-octene.

9. A composition according to claim 3 or claim 7 characterised in that the low linear density polyethylene and/or the propylene copolymer are obtained by a process of copolymerisation in the gaseous phase using a fluidised and/or mechanically stirred bed.

10. A composition according to claim 1 characterised in that the constituents are mixed in the molten condition.

11. A composition according to claim 10 characterised in that the mixture in the molten condition is produced from a mixture of powders or pellets of the constituents, directly in a machine for conversion into finished articles.

12. A polymer composition as defined in claim 1 wherein said linear low density polyethylene has a melting enthalpy which corresponds to a degree of crystallinity of between about 25% and 50%, such crystallinity being expressed with reference to a high density linear ethylene homopolymer.

* * * * *

UNITED STATES PATENT AND TRADEMARK OFFICE
CERTIFICATE OF CORRECTION

PATENT NO. : 4,871,813

DATED : October 3, 1989

INVENTOR(S) : ALAIN SENEZ

It is certified that error appears in the above-identified patent and that said Letters Patent is hereby corrected as shown below:

Col. 2, line 31, "128+ C" should read --128°C--

Col. 9, line 61, "PZ 904" should read --"PZ 904"$^R$--

Col. 10, line 36, "outlet from the dies" should read --outlet from the die--

Signed and Sealed this

Twenty-seventh Day of November, 1990

*Attest:*

HARRY F. MANBECK, JR.

*Attesting Officer*  *Commissioner of Patents and Trademarks*